United States Patent
Huber et al.

(10) Patent No.: US 6,950,319 B2
(45) Date of Patent: Sep. 27, 2005

(54) AC/DC FLYBACK CONVERTER

(75) Inventors: Laszlo Huber, Cary, NC (US); Milan M. Jovanovic, Cary, NC (US); Chien-Chung Chang, Taoyuan (TW)

(73) Assignee: Delta Electronics, Inc., Taipei (TW)

( * ) Notice: Subject to any disclaimer, the term of this patent is extended or adjusted under 35 U.S.C. 154(b) by 174 days.

(21) Appl. No.: 10/438,265

(22) Filed: May 13, 2003

(65) Prior Publication Data

US 2004/0252529 A1 Dec. 16, 2004

(51) Int. Cl.[7] .................. H02M 3/335; H02H 7/122
(52) U.S. Cl. .................. 363/21.12; 363/56.09
(58) Field of Search .................. 363/16, 20, 21.01, 363/21.12, 21.14, 21.15, 21.16, 21.17, 55, 56.01, 56.09, 56.12, 56.1, 56.11

(56) References Cited

U.S. PATENT DOCUMENTS

| | | | | |
|---|---|---|---|---|
| 5,757,626 A | * | 5/1998 | Jovanovic et al. | 363/21.04 |
| 5,867,374 A | * | 2/1999 | Moreau | 363/20 |
| 5,991,172 A | * | 11/1999 | Jovanovic et al. | 363/21.14 |
| 6,005,780 A | * | 12/1999 | Hua | 363/20 |
| 6,088,242 A | * | 7/2000 | Koegel et al. | 363/56.11 |
| 6,239,993 B1 | * | 5/2001 | Fraidlin et al. | 363/56.03 |
| 6,282,103 B1 | * | 8/2001 | Naito et al. | 363/21.12 |
| 6,580,622 B2 | * | 6/2003 | Balakrishnan et al. | 363/50 |

* cited by examiner

Primary Examiner—Matthew V. Nguyen
(74) Attorney, Agent, or Firm—MacPherson Kwok Chen & Heid LLP; Edward C. Kwok

(57) ABSTRACT

A single-stage input-current-shaping ($S^2ICS$) flyback converter achieves substantially reduced conduction losses in the primary side of the $S^2ICS$ flyback converter by connecting a bypass diode between the positive terminal of a full-bridge rectifier and the positive terminal of an energy-storage capacitor. An effective current interleaving between an energy-storage inductor and the bypass diode is thus obtained in the $S^2ICS$ flyback converter around the peak of the rectified line voltage, resulting in a significantly reduced input-current ripple and reduced current stress on the switch. Further, by rearranging the rectifiers in the ICS part of the $S^2ICS$ flyback converter in such a way that the energy-storage capacitor and the ICS inductor are connected to the ac line voltage through only two rectifiers, one diode forward-voltage drop is eliminated, which results in a substantially reduced conduction loss in the primary-side rectifiers.

12 Claims, 10 Drawing Sheets

(a)

(b)

(c)

AC/DC FLYBACK CONVERTER

BACKGROUND OF THE INVENTION

1. Field of the Invention

This invention relates to an improved single-stage input-current-shaping flyback converter with fast output-voltage regulation, and, more particularly, to a single-stage, single-switch input-current-shaping flyback converter with reduced conduction losses in the primary side of the converter.

2. Discussion of the Related Art

In single-stage input-current-shaping ($S^2ICS$) converters, input-current shaping (ICS), isolation, and high-bandwidth output-voltage control are performed in a single conversion step (i.e., without creating a regulated DC bus, as is commonly found in two-stage ICS converters). Most of the $S^2ICS$ circuits integrate a boost ICS stage with a forward or flyback DC/DC-converter stage. Generally, $S^2ICS$ converters meet European and/or Japanese regulatory requirements regarding the line-current harmonic limits, but they do not improve the power factor (PF) and reduce the total harmonic distortion (THD) as much as their two-stage counterparts. Typically, PF for the $S^2ICS$ converters is between 0.8 and 0.9 with a THD in the 40–75% range.

An input-current-shaping circuit of a simple, cost-effective, and efficient $S^2ICS$ flyback converter is described in U.S. Pat. No. 5,991,172 (the "Jovanovic '172 Patent") to M. M. Jovanovic and L. Huber, entitled "AC/DC flyback converter with improved power factor and reduced switching loss," and U.S. Pat. No. 6,005,780 (the "Hua '780 Patent") to G. Hua, entitled "Single-stage ac/dc conversion with PFC-tapped transformers". FIG. 1 shows such an input-current shaping circuit in $S^2ICS$ converter 100. In FIG. 1, ICS in $S^2ICS$ converter 100 is achieved by adding inductor 101 ($L_{ICS}$) in series with rectifier 102 ($D_{ICS}$) to a conventional AC/DC flyback converter without PFC. Inductor 101 and rectifier 102 are connected between the positive terminal of full-bridge rectifier 103 (FBR) and primary-winding tap 105 of flyback transformer 104 (T).

By connecting inductor 101 and rectifier 102 in series to primary-winding tap 105 of flyback transformer 104, the voltage across energy-storage (bulk) capacitor 106 ($C_B$) can be limited to a desired level (e.g., 400 V at the universal line range of 90–264 $V_{rms}$) In fact, when switch 108 (SW) is closed ("on"), winding 107a ($N_1$), which is a portion of primary winding 107 ($N_P$) of flyback transformer 104, appears in series with ICS inductor 101. When switch 108 is open ("off"), winding 107b ($N_2$), which is the other portion of primary winding 107 ($N_P$), appears in series with ICS inductor 101. Thus, regardless of whether switch 108 is open or closed, the voltage across the portion of primary winding 107 conducting the ICS inductor current opposes the rectified line voltage $V_{in}$ across capacitor 109 ($C_{in}$). Consequently, the volt-second balance of the ICS-inductor core is achieved at a substantially reduced bulk-voltage level. In addition, winding 107b provides a direct energy transfer path to the output load 110 when switch 108 is off, thereby improving conversion efficiency. Performance in $S^2ICS$ converter 100 is optimized by varying the tap location on the primary winding 107 of flyback transformer 104.

Input-current shaping inductor 101 is usually designed to operate in discontinuous conduction mode (DCM). Under DCM operation, low input-current harmonic distortion is achieved because a DCM boost converter inherently draws a near sinusoidal current if its duty cycle is held relatively constant during a half line cycle. If the inductance of ICS inductor 101 exceeds its maximum value for DCM operation, inductor 101 operates in the continuous conduction mode (CCM) during a narrow interval near the peak of the rectified line voltage. Generally, a larger inductance of inductor 101 increases converter efficiency and decreases input-current ripples. However, a larger inductance of inductor 101 also decreases input power factor and increases line current harmonics.

A flyback transformer can operate in DCM, CCM, or at the DCM/CCM boundary. As described in the Jovanovic '172 patent, turn-on switching loss can be substantially reduced by operating flyback transformer 104 at the DCM/CCM boundary. To operate flyback transformer at the DCM/CCM boundary over the entire line and load range, a variable switching-frequency control circuit is used. Control circuit 120 provides the required control signal SW for periodically opening and closing switch 108.

Input-filter capacitor 109 can be connected on either the DC side of full-wave bridge rectifier 103 (such as shown in FIG. 1), or the AC side of full-wave bridge rectifier 103. Similarly, input-filter inductors 111a ($L_{in1}$) and 111b ($L_{in2}$) can be connected on either side of full-bridge rectifier 103.

With ICS-inductor 101 operating in DCM, $S^2ICS$ flyback converter 100 is well suited for universal-line applications (e.g., in a notebook adapter or charger). In such a configuration, the line current quality of $S^2ICS$ converter 100 is approximately the same at low-line and high-line voltages, as explained in U.S. Pat. No. 5,757,626 (the "Jovanovic '626 Patent") to M. M. Jovanovic and L. Huber, entitled "Single-stage, single-switch, isolated power-supply technique with input-current shaping and fast output-voltage regulation". However, the DCM operation of the ICS inductor results in a larger current stress on switch 108 and larger input-current ripple. A larger current stress on switch 108 reduces converter efficiency, and a larger input-current ripple requires a larger input filter. Furthermore, the conduction loss of the primary-side rectifiers (i.e., full bridge rectifier 103 and rectifier 102) in FIG. 1 is high because the current of ICS inductor 102 always includes three rectifiers: rectifiers 103a, 102, and 103d conduct during a positive half cycle of line voltage $v_{in}$, and rectifiers 103b, 102, and 103c conduct during a negative half cycle of line voltage $v_{in}$. Generally, $S^2ICS$ flyback converter 100 in FIG. 1 is limited to operation at power levels below 100 W.

To improve efficiency and power level, two $S^2ICS$ flyback converters can be interleaved—i.e., two converters can be connected in parallel, with the switching instances of the primary gate signals phase-shifted by 180°. With interleaving, input and output filter sizes can be significantly reduced and the total power loss can be evenly distributed between the two parallel converters. However, interleaving of two converters significantly increases the number of components. Furthermore, if the flyback transformer operates at the DCM/CCM boundary, interleaving of variable-frequency converters requires a relatively complex control circuit.

It is thus desired to improve efficiency and to increase the maximum power level of the $S^2ICS$ flyback converter by reducing primary-side conduction losses caused by increased input-current ripple and increased rectifier conduction losses in a simple and cost-effective way.

SUMMARY OF THE INVENTION

The present invention provides a single-stage input-current-shaping ($S^2ICS$) flyback converter that has substantially reduced conduction losses in the primary side of the converter. According to one embodiment of the present invention, a bypass diode is connected between the positive terminal of the full-bridge rectifier and the positive terminal of an energy-storage capacitor. In that configuration, current interleaving between an energy-storage inductor in the ICS part of the $S^2ICS$ flyback converter and the bypass diode is achieved around the peak of the rectified line voltage, which results in a significantly reduced input-current ripple and reduced current stress on the switch.

According to another embodiment of the present invention, the rectifiers in the ICS part of the $S^2ICS$ flyback converter are arranged in such a way that the energy-storage capacitor and the ICS inductor are connected to the AC line voltage through only two rectifiers, thus eliminating one diode forward-voltage drop and hence achieving a substantially reduced conduction loss in the primary-side rectifiers.

Accordingly, the present invention improves both efficiency and the maximum power level of a $S^2ICS$ flyback converter by reducing primary-side conduction losses caused by increased input-current ripple and increased rectifier conduction losses.

The present invention is better understood upon consideration of the detailed description below and the accompanying drawings.

BRIEF DESCRIPTION OF THE DRAWINGS

To facilitate comparison among features shown in the various figures, like elements are assigned like reference numerals.

DETAILED DESCRIPTIONS OF THE PREFERRED EMBODIMENTS

Figure 1:
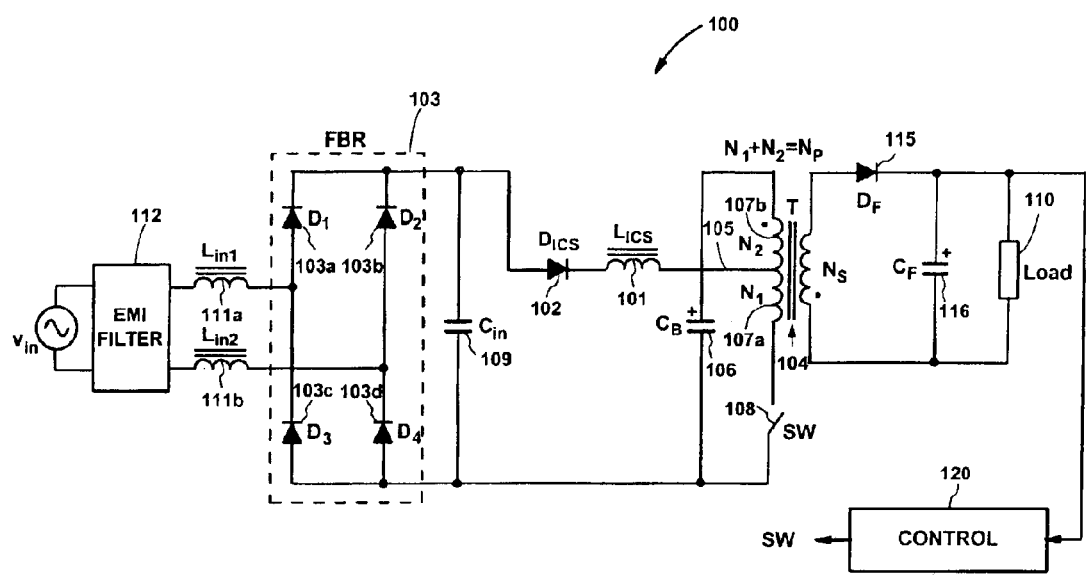
FIG. 1 shows $S^2ICS$ converter 100 with input current-shaping of the prior art.
Figure 2:
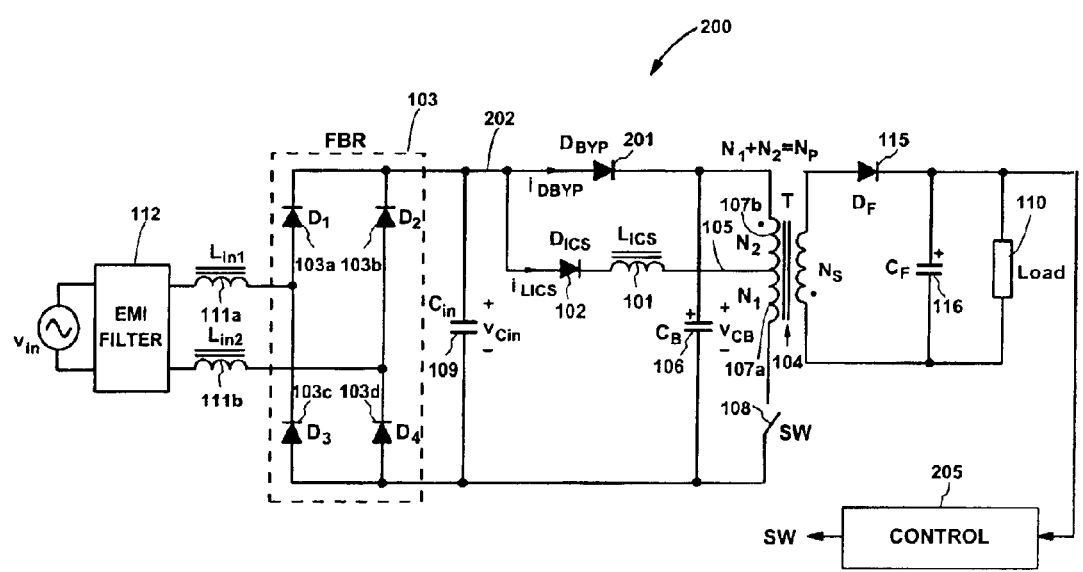
FIG. 2 is a circuit diagram of $S^2ICS$ flyback converter 200, according to one embodiment of the present invention.

FIG. 2 is a circuit diagram of $S^2ICS$ flyback converter 200, according to one embodiment of the present invention. As shown in FIG. 2, $S^2ICS$ flyback converter 200 is substantially the same as $S^2ICS$ flyback converter 100 of FIG. 1, except that bypass diode 201 ($D_{BYP}$) is connected between the positive terminal of full-bridge rectifier (FBR) 103 and the positive terminal of energy-storage (bulk) capacitor 106 ($C_B$). A control circuit 205 provides a control signal SW for periodically opening and closing switch 108, according to a switching control scheme. One such scheme, for example, opens and closes switch 108 at a variable frequency such that transformer 104 operates at the boundary between discontinuous and continuous conduction modes. Secondary-side rectifier 115 can be implemented either with a Schottky rectifier or with a synchronous rectifier.

Figure 3:
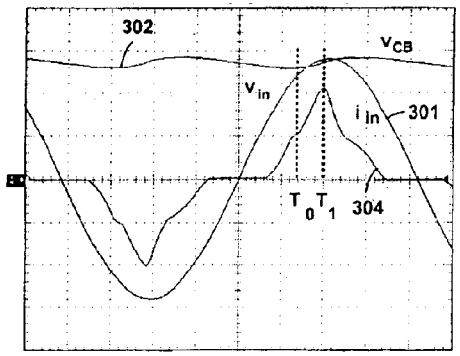
FIG. 3(a) shows typical waveforms of line voltage $v_{in}$, line current $i_{in}$, and voltage $V_{CB}$ of bulk capacitor 106 in $S^2ICS$ flyback converter 200.
FIG. 3(b) shows waveforms of line current $i_{in}$, current $I_{LICS}$ of ICS inductor 101, current $i_{DBYP}$ of bypass diode 201, and voltage $v_{Cin}$ of input filter capacitor 109 in $S^2ICS$ flyback converter 200 at instant $T_0$, which is indicated in FIG. 3(a).
FIG. 3(c) shows waveforms of line current $i_{in}$, current $i_{LICS}$ of ICS inductor 101, current $i_{DBYP}$ of bypass diode 201, and voltage $V_{Cin}$ of input filter capacitor 109 in $S^2ICS$ flyback converter 200 at instant $T_1$, which is indicated in FIG. 3(a).
Figure 3:
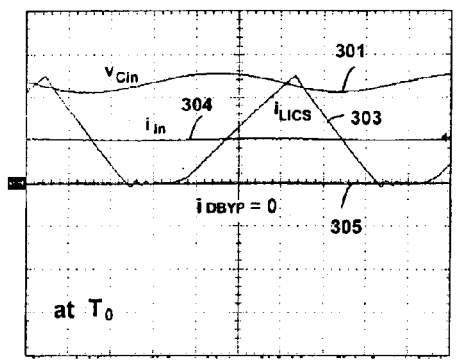
Figure 3:
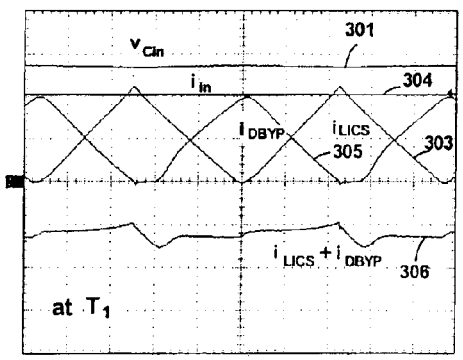

FIGS. 3(a), 3(b) and 3(c) illustrate the basic operation of bypass diode 201 and the effects of diode 201 on the ICS waveforms. FIG. 3(a) shows typical waveforms of line voltage $v_{in}$, line current $i_{in}$, and voltage $V_{CB}$ of bulk (or energy-storage) capacitor 106. FIGS. 3(b) and 3(c) respectively show waveforms of line current $i_{in}$, current $i_{LICS}$ of ICS inductor 101, current $i_{DBYP}$ of bypass diode 201, and voltage $V_{Cin}$, of input filter capacitor 109 at two different instants $T_0$ and $T_1$ that are indicated in FIG. 3(a).

At instant $T_0$, as shown in FIGS. 3(a) and 3(b), rectified line voltage $v_{in}$ at terminal 202 (waveform 301) is lower than voltage $V_{CB}$ of capacitor 106 (waveform 302), and bypass diode 201 is not conducting (i.e. current $i_{DBYP}$=0, waveform 305). The peak value of DCM ICS-inductor current $i_{LICS}$ (waveform 303) is slightly larger than twice line current $i_{in}$ (waveform 304), which is the average of ICS-inductor current $i_{LICS}$ over a switching cycle. As shown in FIG. 3(b), the high-frequency ripple component of ICS-inductor current $i_{LICS}$ that flows through input-filter capacitor 109 generates a substantial ripple voltage $V_{Cin}$, across capacitor 109. At instant $T_1$, as shown in FIGS. 3(a) and 3(c), rectified line voltage $v_{in}$ (waveform 301), which is near its peak value, is higher than bulk-capacitor voltage $V_{CB}$ (waveform 302) and bypass diode 201 is conducting. As shown in FIG. 3(c), the peak value of DCM ICS-inductor current $i_{LICS}$ (waveform 303) is significantly smaller than twice line current $i_{in}$ (waveform 304), as in FIG. 3(b), i.e., ICS-inductor current $i_{LICS}$ is only slightly larger than line current $i_{in}$, which is at its peak value at instant $T_1$. In fact, when bypass diode 201 conducts, energy-storage capacitor 106 is connected in parallel to input-filter capacitor 109, thus keeping voltage $v_{Cin}$ across input-filter capacitor 109 at an almost constant level. Consequently, the current through input-filter capacitor 109, which includes high-frequency ripple components of current $i_{LICS}$ of ICS inductor 101 and current $i_{DBYP}$ of bypass diode 201, does not exhibit a high ripple. As shown in FIG. 3(c), to result in such low-ripple, DCM current $i_{DBYP}$ of bypass diode 201 has substantially the same waveshape as DCM current $i_{LICS}$ of ICS-inductor 101, but phase shifted by approximately 180° from current $i_{LICS}$. In converter 200 of FIG. 2, current $i_{DBYP}$ of bypass diode 201 is interleaved with current $i_{LICS}$ of ICS-inductor 101 at or about the peak of the line voltage $v_{in}$ (waveform 301).

As illustrated in FIG. 3(c), at instant $T_1$, the sum of interleaved currents $i_{LICS}$ and $i_{DBYP}$, which is shown as waveform 306, exhibits a very small ripple. The average of current sum $i_{LICS}+i_{DBYP}$ over a switching cycle is equal to line current $i_{in}$. The small high-frequency ripple component of current sum $i_{LICS}+i_{DBYP}$ flows through input-filter capacitor 109 generating a small ripple voltage $V_{Cin}$ across capacitor 109. Because the current sum $i_{LICS}+i_{DBYP}$ has a low ripple around the peak of the rectified line voltage (i.e., waveform 301), the size of input filter capacitor 109 can be significantly reduced. Also, because the peak value of current $i_{LICS}$ is reduced almost 50% compared to the peak current without interleaving, the current stress on switch 108 is also significantly reduced.

In FIG. 2, input-filter capacitor 109 is connected on the DC side of full-wave bridge rectifier 103. However, the effect of bypass diode 201 on the operation of S²ICS flyback converter 200 is the same, even if input-filter capacitor 109 is connected on the AC side of full-bridge rectifier 103. Similarly, input-filter inductors 111a and 111b can be connected on either side of full-wave bridge rectifier 103.

Figure 4:
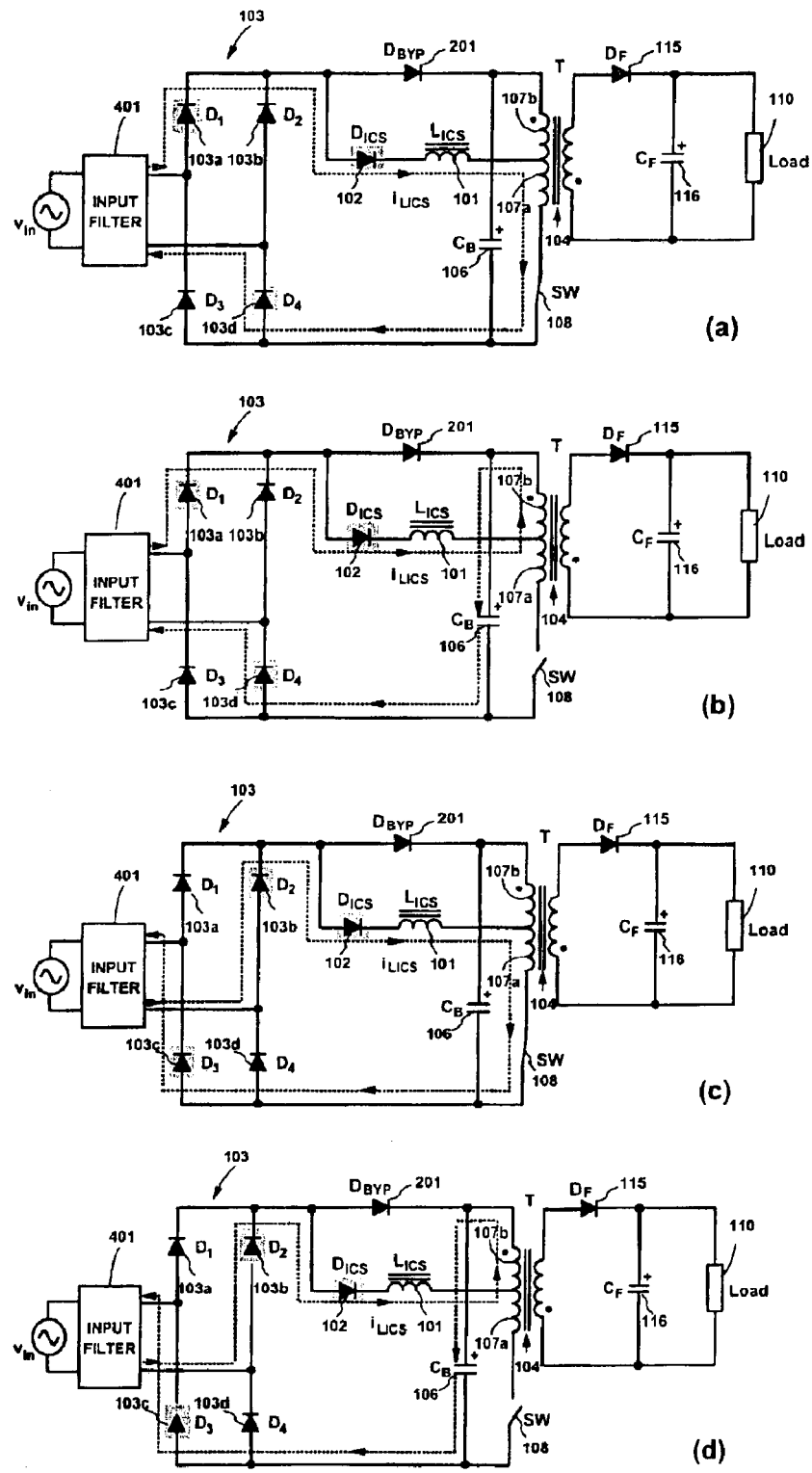
FIG. 4(a) shows the current path of ICS inductor current $i_{LICS}$ in $S^2ICS$ flyback converter 200 during a positive half-cycle of line voltage $V_{in}$, when switch 108 is closed.
FIG. 4(b) shows the current path of ICS inductor current $i_{LICS}$ in $S^2ICS$ flyback converter 200 during a positive half-cycle of line voltage $v_{in}$, when switch 108 is open.
FIG. 4(c) shows the current path of ICS inductor current $i_{LICS}$ in $S^2ICS$ flyback converter 200 during a negative half-cycle of line voltage $v_{in}$, when switch 108 is closed.
FIG. 4(d) shows current path of ICS inductor current $i_{LICS}$ in $S^2ICS$ flyback converter 200 during a negative half-cycle of line voltage $V_{in}$, when switch 108 is open.
Figure 5:
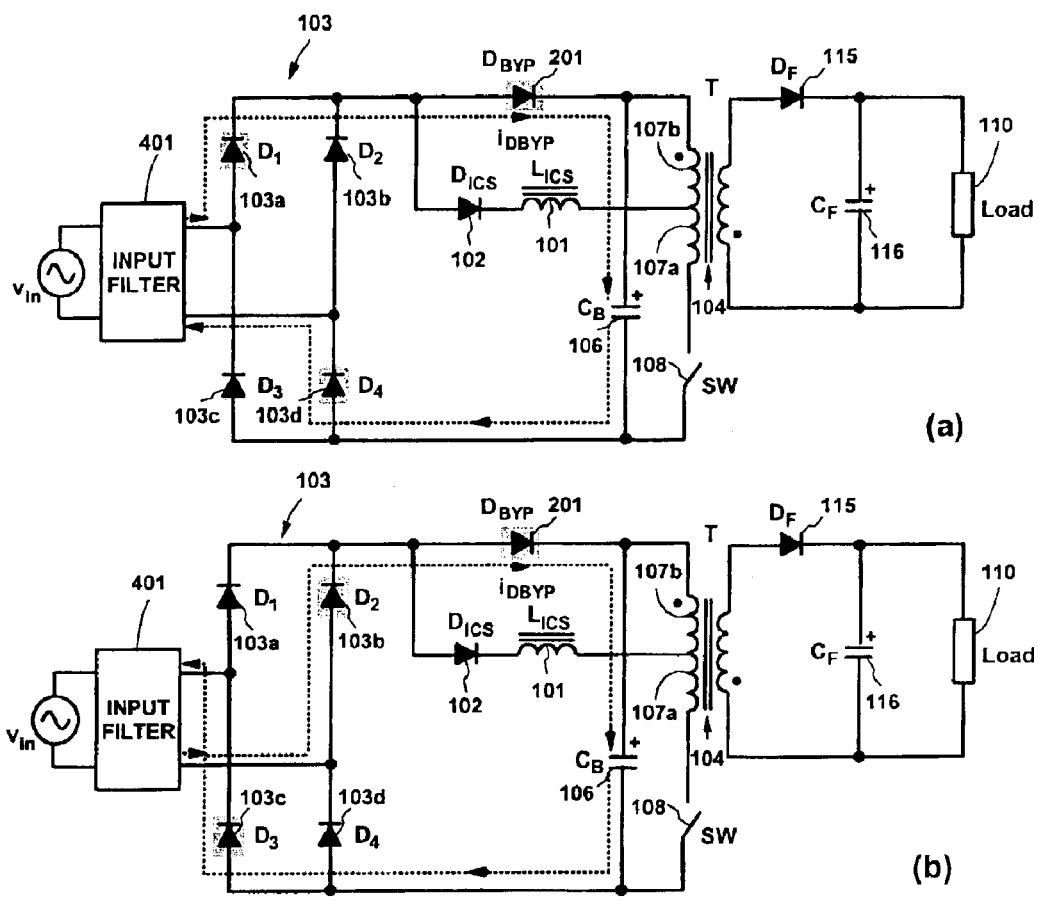
FIG. 5(a) shows the path of bypass-diode current $i_{DBYP}$ in $S^2ICS$ flyback converter 200 during a positive half-cycle of the line voltage.
FIG. 5(b) shows the path of bypass-diode current $i_{DBYP}$ in $S^2ICS$ flyback converter 200 during a negative half-cycle of the line voltage.

The paths of ICS-inductor current $i_{LICS}$ and bypass-diode current $i_{DBYP}$ each include three rectifiers, resulting in a substantial conduction loss. FIGS. 4 and 5 show the paths of ICS-inductor current $i_{LICS}$ and bypass-diode current $i_{DBYP}$ under different operation modes. To simplify description, FIGS. 4 and 5 both show input-filter capacitor 109 connected on the AC side of full-wave bridge rectifier 103 and incorporated into input-filter block 401 with EMI filter 112 and input-filter inductors 111a and 111b.

FIGS. 4(a) and 4(b) show the paths of ICS-inductor current $i_{LICS}$ during a positive half-cycle of line voltage $v_{in}$, with switch 108 closed and open, respectively. As shown in FIG. 4(a), with switch 108 closed and input voltage $V_{in}$ at a positive half-cycle, the current path of ICS-inductor current $i_{LICS}$ includes rectifiers 103a and 103d of full-wave bridge rectifier 103, rectifier 102, ICS inductor 101, primary winding 107a of transformer 104 and switch 108. When switch 108 is open and input voltage $V_{in}$, is at a positive half-cycle, the current path of ICS-inductor current $i_{LICS}$ includes rectifiers 103a and 103d of full-wave bridge rectifier 103, rectifier 102, ICS inductor 101, primary winding 107b of transformer 104 and bulk capacitor 106.

FIGS. 4(c) and 4(d) show the paths of ICS-inductor current $i_{LICS}$ during a negative half-cycle of line voltage $V_{in}$, with switch 108 closed and open, respectively. As shown in FIG. 4(c), with switch 108 closed and input voltage $V_{in}$, at a negative half-cycle, the current path of ICS-inductor current $i_{LICS}$ includes rectifiers 103b and 103c of full-wave bridge rectifier 103, rectifier 102, ICS inductor 101, primary winding 107a of transformer 104 and switch 108. When switch 108 is open and input voltage $v_{in}$ is at a negative half-cycle, the current path of ICS-inductor current $i_{LICS}$ includes rectifiers 103b and 103c of full-wave bridge rectifier 104, rectifier 102, ICS inductor 101, primary winding 107b of transformer 104 and bulk capacitor 106.

FIGS. 5(a) and 5(b) show the paths of bypass-diode current $i_{DBYP}$ during positive and negative half-cycles of the line voltage, respectively. As shown in FIG. 5(a), during a positive half cycle of line voltage $v_{in}$, the current path of bypass-diode current $i_{DBYP}$ includes rectifiers 103a and 103d of full bridge rectifier 104, bypass-diode 201, and bulk capacitor 106. During a negative half-cycle of line voltage $V_{in}$, as shown in FIG. 5(b), the current path of bypass-diode current $i_{DBYP}$ includes rectifiers 103b and 103c of full bridge rectifier 104, bypass-diode 201, and bulk capacitor 106.

Figure 6:
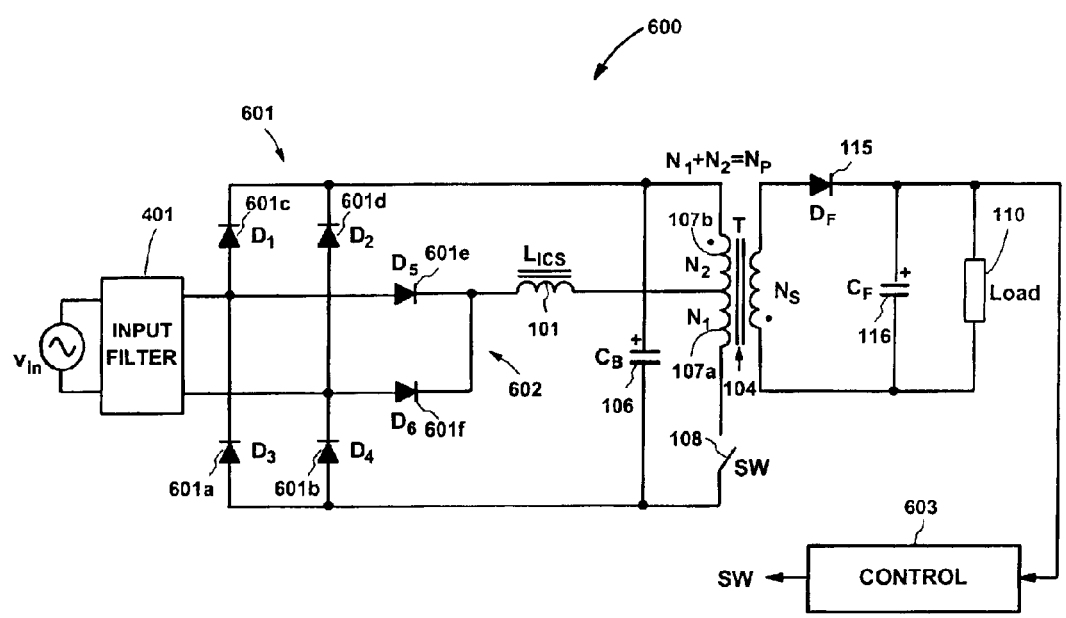
FIG. 6 shows a circuit diagram of $S^2ICS$ flyback converter 600, according to a second embodiment of the present invention.

By arranging the primary-side rectifiers such that energy-storage capacitor 106 and ICS inductor 101 are connected to AC line voltage $v_{in}$, through two separated full-wave bridge rectifiers, a diode forward-voltage drop can be eliminated from the current paths of both ICS-inductor current $i_{LICS}$ and bypass-diode current $i_{BYPD}$. Such an arrangement is shown in FIG. 6, for example, which shows a circuit diagram of S²ICS flyback converter 600, according to a second embodiment of the present invention. In FIG. 6, energy-storage capacitor 106 and ICS-inductor 101 are connected to AC line voltage $v_{in}$, through two full-wave bridge rectifiers 601 and 602, formed respectively by rectifiers 601a, 601b, 601c and 601d, and 601a, 601b, 601e and 601f (i.e., rectifiers 601a and 601b are common to both full-bridge rectifiers). Even though the total number of the primary-side rectifiers in S²ICS flyback converter 600 in FIG. 6 is the same as the total number of primary-side rectifiers in S²ICS flyback converter 200 of FIG. 2, as shown below, only two rectifiers conduct at a time in a current path of S²ICS. A control circuit 603 provides a control signal SW for periodically opening and closing switch 108 according to a switching control scheme. As in control circuit 205 of FIG. 2, one applicable switching scheme, for example, opens and closes switch 108 such that transformer 104 operates at the boundary between discontinuous and continuous conduction modes.

Figure 7:
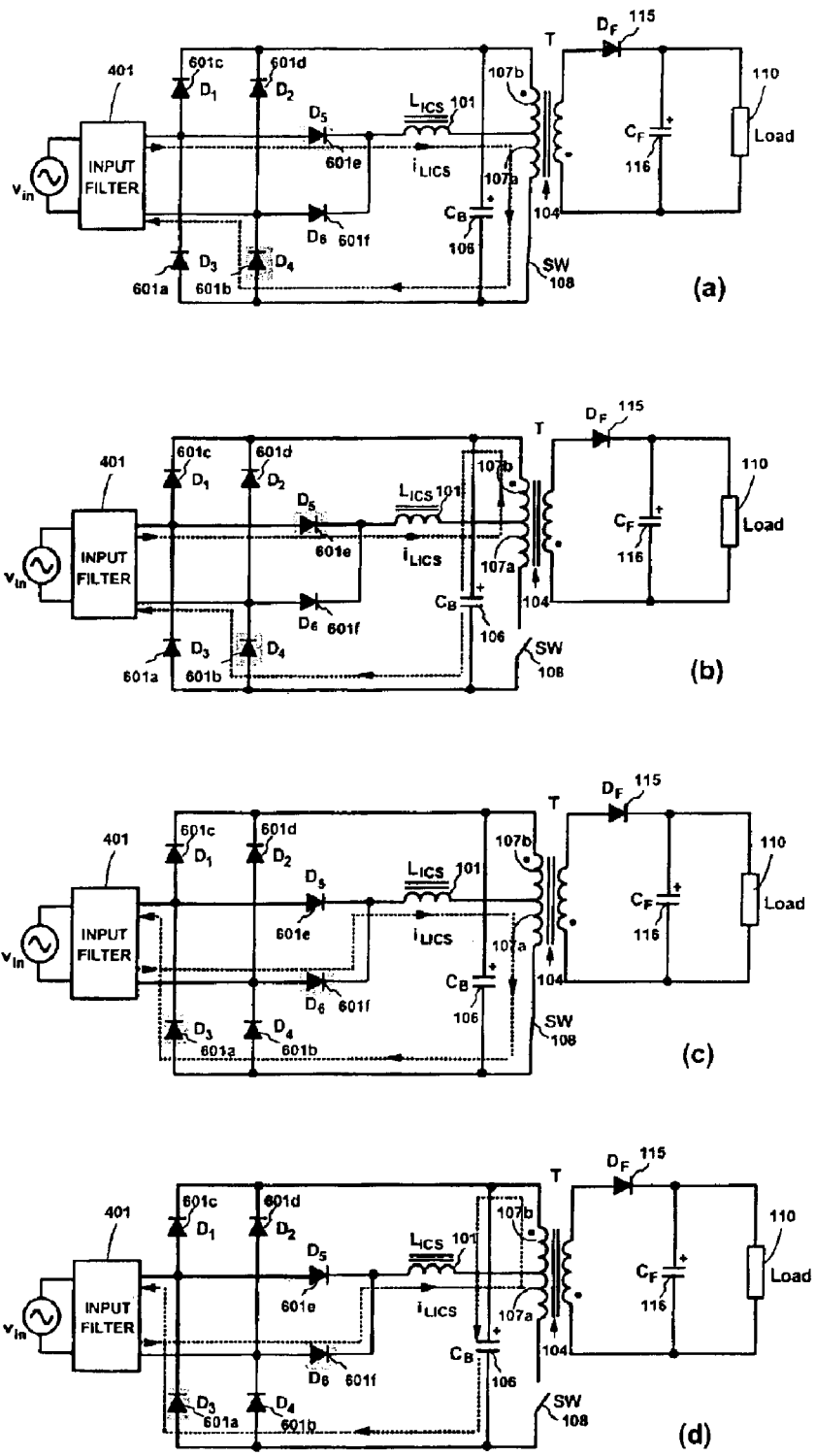
FIG. 7(a) shows the current path for ICS-inductor current $i_{LICS}$ in $S^2ICS$ flyback converter 600 during a positive half-cycle of line voltage $v_{in}$, when switch 108 is closed.
FIG. 7(b) shows the current path for ICS-inductor current $i_{LICS}$ in $S^2ICS$ flyback converter 600 during a positive half-cycle of line voltage $v_{in}$, when switch 108 is open.
FIG. 7(c) shows the current path for ICS-inductor current $i_{LICS}$ in $S^2ICS$ flyback converter 600 during a negative half-cycle of line voltage $v_{in}$, when switch 108 is closed.
FIG. 7(d) shows the current path for ICS-inductor current $i_{LICS}$ in $S^2ICS$ flyback converter 600 during a negative half-cycle of line voltage $V_{in}$, when switch 108 is open.

For S²ICS converter 600, the paths of ICS-inductor current $i_{LICS}$ and bypass-diode current $i_{DBYP}$ under different operation modes are shown in FIGS. 7(a)–7(d), 8(a) and 8(b). FIG. 7(a) shows the current path for ICS-inductor current $i_{LICS}$ during a positive half-cycle of line voltage $V_{in}$, when switch 108 is closed. As shown in FIG. 7(a), during a positive half-cycle of line voltage $v_{in}$, with switch 108 closed, current path of ICS-inductor current $i_{LICS}$ of ICS inductor 101 includes rectifiers 601b, 601e, ICS inductor 101, portion 107a of a primary winding of transformer 104, and switch 108. FIG. 7(b) shows the current path for ICS-inductor current $i_{LICS}$ during a positive half-cycle of line voltage $v_{in}$, when switch 108 is open. During a positive half-cycle of line voltage $v_{in}$, with switch 108 open, current path of ICS-inductor current $i_{LICS}$ of ICS inductor 101 includes rectifiers 601b, 601e, ICS inductor 101, portion 107b of a primary winding of transformer 104, and bulk capacitor 106.

FIG. 7(c) shows the current path for ICS-inductor current $i_{LICS}$ during a negative half-cycle of line voltage $V_{in}$, when switch 108 is closed. During a negative half-cycle of line voltage $v_{in}$, with switch 108 closed, current path of ICS-inductor current $i_{LICS}$ of ICS inductor 101 includes rectifiers 601a, 601f, ICS inductor 101, portion 107a of a primary winding of transformer 104, and switch 108. FIG. 7(d) shows the current path for ICS-inductor current $i_{LICS}$ during a negative half-cycle of line voltage $v_{in}$, when switch 108 is open. During a negative half-cycle of line voltage $V_{in}$, with switch 108 open, current path of ICS-inductor current $i_{LICS}$ of ICS inductor 101 includes rectifiers 601a, 601f, ICS inductor 101, portion 107b of a primary winding of transformer 104, and bulk capacitor 106.

Figure 8:
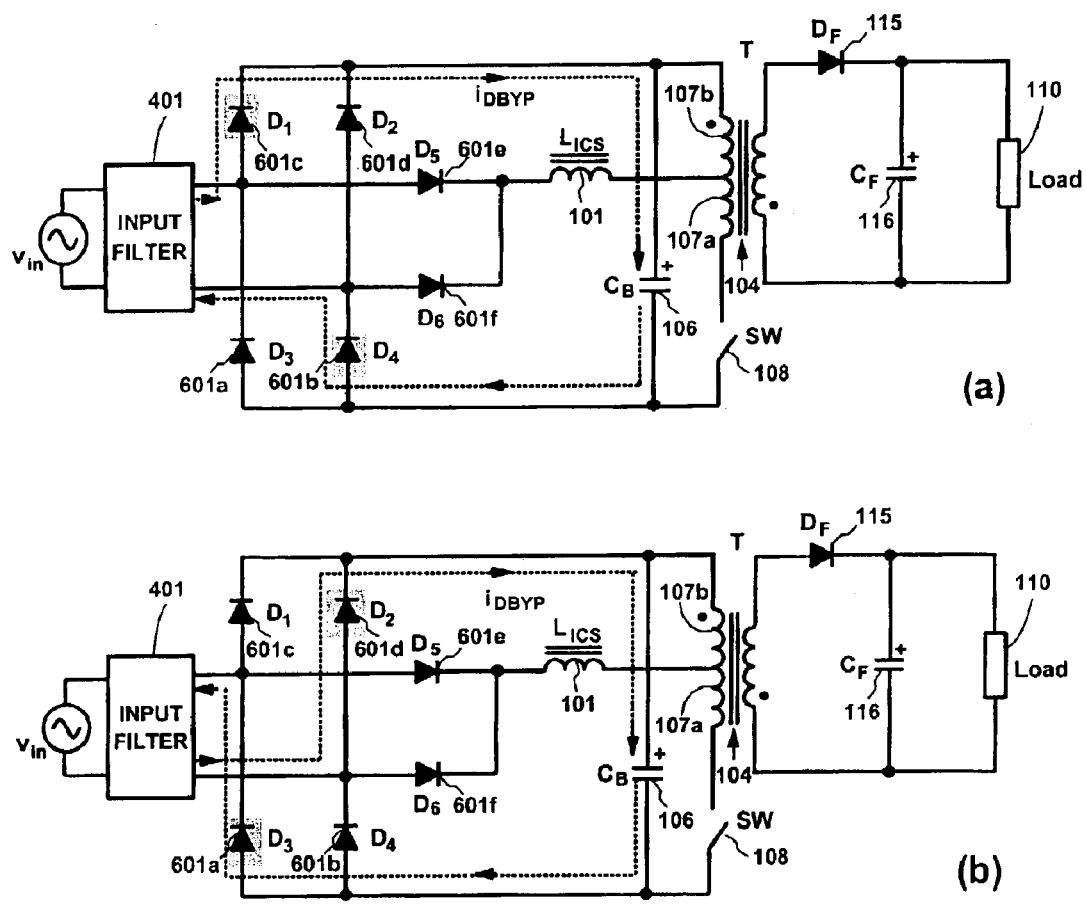
FIG. 8(a) shows the path of bypass-diode current $i_{DBYP}$ in $S^2ICS$ flyback converter 600 during a positive half-cycle of line voltage $v_{in}$.
FIG. 8(b) shows the path of bypass-diode current $i_{DBYP}$ in $S^2ICS$ flyback converter 600 during a negative half-cycle of line voltage $v_{in}$.

FIG. 8(a) shows the path of bypass-diode current $i_{DBYP}$ during a positive half-cycle of line voltage $v_{in}$. During a positive half-cycle of line voltage $v_{in}$, the current path of bypass-diode current $i_{BYPD}$ includes rectifiers 601b, 601c, and bulk capacitor 106. FIG. 8(b) shows the path of bypass-diode current $i_{DBYP}$ during a negative half-cycle of line voltage $v_{in}$. During a negative half-cycle of line voltage $v_{in}$, the current path of bypass-diode current $i_{BYPD}$ includes rectifiers 601a, 601d, and bulk capacitor 106.

With the reduced number of diode-forward-voltage drops, the conduction loss of the primary-side rectifiers in the $S^2ICS$ flyback converter in FIG. 6 is substantially reduced.

Figure 9:
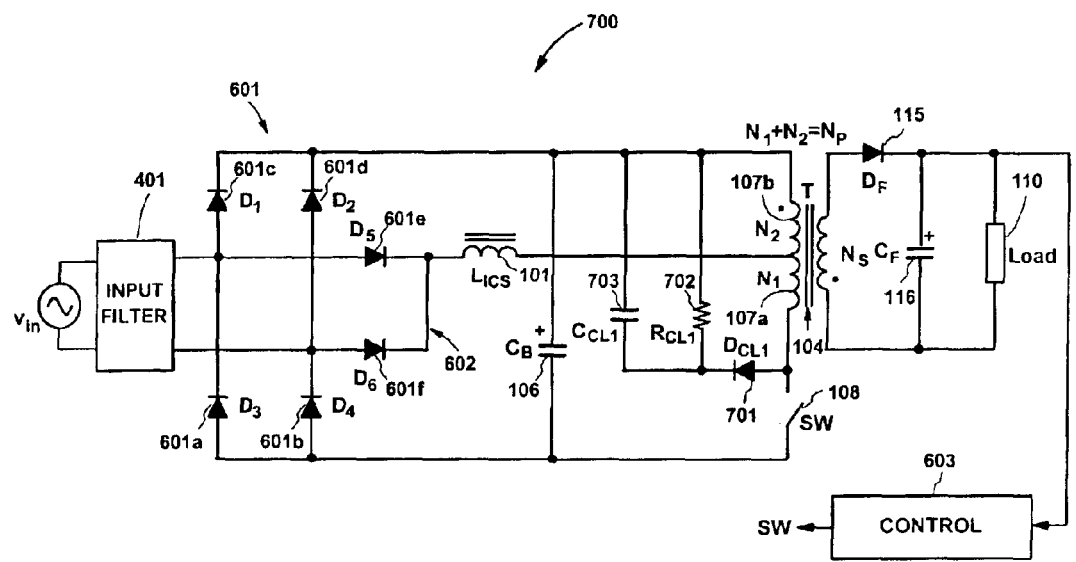
FIG. 9 shows a circuit diagram of $S^2ICS$ converter 700, including RCD clamp circuit.

FIG. 9 shows a circuit diagram of $S^2ICS$ converter 700, which differs from the circuit diagram of $S^2ICS$ converter 600 in FIG. 6 in an additional RCD clamp circuit that includes rectifier 701, resistor 702, and capacitors 703. This RCD clamp is used to limit the voltage stress on switch 108 caused mainly by the leakage inductance of transformer 104.

Figure 10:
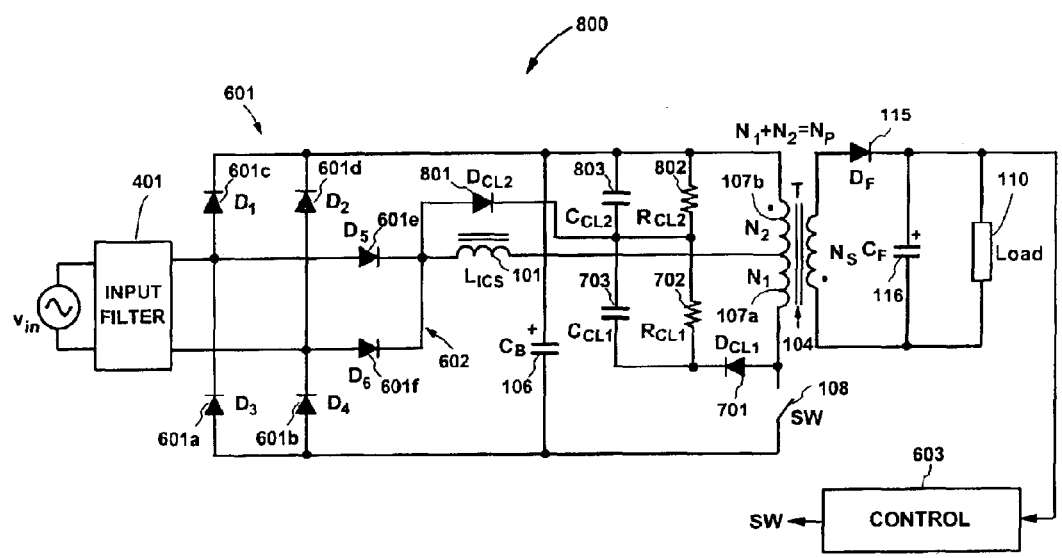
FIG. 10 shows a circuit diagram of $S^2ICS$ converter 800 including a combined RCD clamp for rectifiers 601e and 601f of full-wave bridge rectifier 602 and for switch 108.

Rectifiers 601e and 601f of full-wave bridge rectifier 602 in FIG. 9 may be also exposed to considerable voltage stresses because of the ringing between ICS inductor 101 and the capacitance of the inversely polarized rectifiers in full-wave bridge rectifier 602. This ringing occurs after the reset of ICS inductor 101 in a switching cycle. To limit the voltage stress on rectifiers 601e and 601f, the common-cathode voltage of rectifiers 601e and 601f is clamped. To clamp the voltage of rectifiers 601e and 601f, an RCD clamp that is similar to the RCD clamp for switch 108 (described above) can be used. FIG. 10 shows, for example, a circuit diagram of $S^2ICS$ converter 800, which combines the voltage clamp for rectifiers 601e and 601f and the voltage clamp for switch 108 in an RCD clamp circuit that includes rectifiers 701 and 801, resistors 702 and 802, and capacitors 703 and 803. By properly selecting the values of the resistances and capacitances in the voltage divider circuit that includes resistors 702 and 802 and capacitors 703 and 803, the voltage clamp level for rectifiers 601e and 601f and the voltage clamp level for switch 108 can be optimized. A simplified implementation of the RCD clamp circuit in FIG. 10 is obtained when resistor 702 is shorted and the cathodes of rectifiers 701 and 801 are connected together. The voltages of rectifiers 601a and 601b of full-wave bridge rectifier 601 are already clamped to the bulk-capacitor voltage through rectifiers 601c and 601d of full-wave bridge rectifier 601.

In flyback converter 200 of FIG. 2, a voltage clamp circuit can be used to limit the voltage stress on rectifier 102, in the manner similar to the voltage clamp circuits described above with respect to FIGS. 9 and 10.

The above detailed description is provided to illustrate the specific embodiments of the present invention. Numerous modifications and variations within the scope of the present invention are possible. The present invention is set forth in the claims set forth in the following.

We claim:

1. A flyback converter with input-current shaping and output-voltage regulation, comprising:
    a first bridge rectifier coupled to receive an AC power supply voltage and having an output terminal providing a first rectified voltage;
    an energy-storage inductor coupled to receive the first rectified voltage from the first bridge rectifier;
    a second bridge rectifier coupled to receive the AC power supply voltage and having an output terminal providing a second rectified voltage;
    an energy-storage capacitor coupled to receive the second rectified voltage from the second bridge rectifier;
    a transformer having a primary winding including a tap that divides the primary winding into a first portion and a second portion; said tap of the primary winding coupled to the energy storage inductor, and said second portion of the primary winding coupled to the energy-storage capacitor; and
    a switch switchably coupling the first portion of the primary winding of the transformer to a ground terminal.

2. A flyback converter as in claim 1 further comprising:
    a secondary winding of the transformer;
    an output-filter capacitor;
    a rectifier coupling the secondary winding of the transformer and the output-filter capacitor;
    an output terminal connecting a load across the output-filter capacitor and a second ground terminal.

3. A flyback converter as in claim 2, wherein the rectifier comprises a Schottky rectifier.

4. A flyback converter as in claim 2, wherein the rectifier comprises a synchronous rectifier.

5. A flyback converter as in claim 1 further comprising a control circuit for operating the transformer at the boundary of the discontinuous and continuous conduction modes.

6. A flyback converter as in claim 1, wherein the energy-storage inductor operates in a discontinuous conduction mode and the second bridge rectifier becomes conducting around the peak of the second rectified voltage when the second rectified voltage is larger than the voltage across the energy-storage capacitor.

7. A flyback converter as in claim 6, wherein the current of the second bridge rectifier is a discontinuous current interleaved with the discontinuous current of the energy-storage inductor.

8. A flyback converter as in claim 1, wherein the first bridge rectifier and the second bridge rectifier include rectifiers common to both bridge rectifiers.

9. A flyback converter as in claim 1 further comprising a voltage clamp to limit the voltage stress on the rectifiers of the first bridge rectifier.

10. A flyback converter as in claim 9, wherein the voltage clamp comprises a first RCD clamp.

11. A flyback converter as in claim 10 further comprising a second RCD clamp coupling the switch and the energy-storage capacitor.

12. A flyback converter as in claim 11, wherein the first RCD clamp and the second RCD clamp are combined.

\* \* \* \* \*